Figure 1:
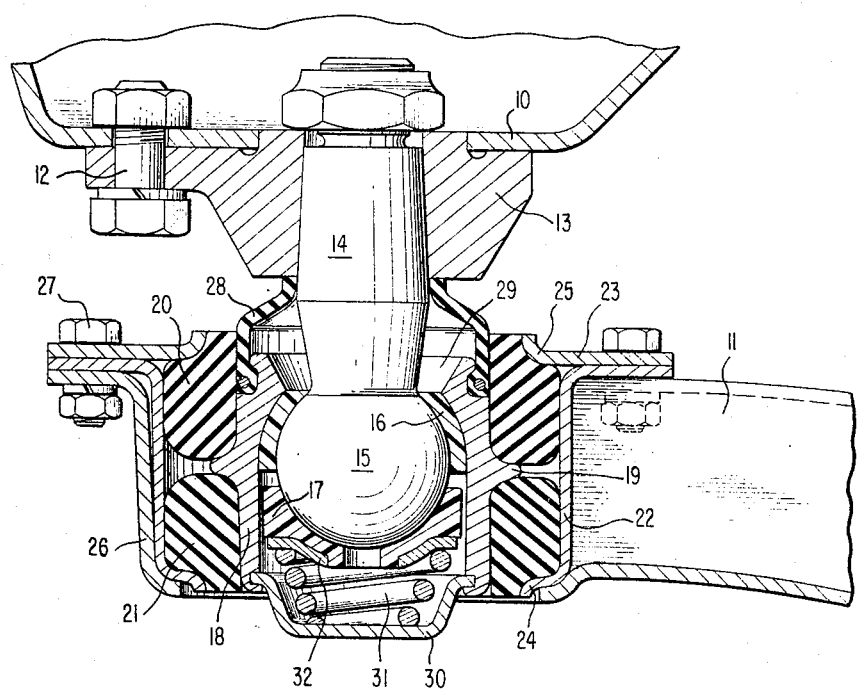

United States Patent Office 3,282,602
Patented Nov. 1, 1966

3,282,602
RESILIENT BALL JOINT CONNECTION FOR VEHICLE SUSPENSIONS
Walter Willingshofer, Hofingen, Wurttemberg, and Alf John Muller, Stuttgart-Bad Cannstatt, Germany, assignors to Daimler-Benz Aktiengesellschaft, Stuttgart-Unterturkheim, Germany
Filed Nov. 6, 1964, Ser. No. 409,409
Claims priority, application Germany, Nov. 22, 1963, D 42,994
15 Claims. (Cl. 280—96.2)

The present invention relates to an elastic bearing, and more particularly to elastic bearings of wheel guide members, especially for the suspension of steerable front wheels in motor vehicles.

Bearing supports of wheel guide members in motor vehicles by the interposition of rubber cushions or buffers, especially of rubber bushings, are known per se, and more particularly they are known with cross guide members as also—for example, in connection with driven swinging half-axles—with thrust guide members arranged in the vehicle longitudinal direction which are pivotally supported at the vehicle superstructure on a pin by the interposition of rubber rings.

In contradistinction thereto, the present invention aims at an elastic bearing support of guide members, especially for the suspension of steerable front wheels, by means of two superposed cross guide members in such a manner that the bearing support is suitable above all for an unconstrained absorption of the forces transmitted from the guide member to the vehicle superstructure including the brake forces, and essentially consists in that the guide member is supported on a ball joint under interposition of two rubber rings arranged one above the other.

In a particularly advantageous arrangement of the present invention, the rubber rings are inserted, on the one hand, into an outer sleeve which axially supports the same and is secured at the guide member or is constituted by the latter; on the other hand, the rubber rings enclose the ball joint by the interposition of dish-like bearing sockets as well as of an inner sleeve axially supporting the rubber rings in the opposite direction from the external sleeve. The outer and inner sleeves are preferably so dimensioned that the rubber rings are retained by the same under stress. Advantageously, the dish-like bearing sockets receiving the bearing joint are made of plastic material whereas the bearing joint is constituted, for example, by the ball head of a bearing pin arranged in a suspended manner in the vehicle superstructure.

The guide member can be constructed as cross guide member or also as longitudinal guide member or inclined member whereby additional guide members or guide elements may be provided for the unequivocal guidance of the wheel in the spring direction. For example, the guide member supported in a ball-joint-like manner at the vehicle superstructure may form together with a second guide member a guide triangle which constitutes, for example, the lower guide member of two superposed guide assemblies.

The following advantages are realized by the present invention:

By reason of the construction of the joint as ball joint, all forces and moments are transmitted in an unconstrained manner from the guide member to the vehicle superstructure by way of the joint. This also applies in particular for the brake forces acting at the wheel which can be absorbed by the ball joint practically without bending loads or stresses, and more particularly this is also possible when the pivot axis of the guide member extends obliquely to the driving direction. The joint is insensitive against cardanic movements. The form of the guide member can be kept very simple at the joint connection, even with the absorption of high brake forces. Fits and small tolerances are not required. The assembly of the joint as well as of the entire wheel suspension is considerably simplified thereby. The joint practically requires no service; especially this is not necessary if the bearing sockets are made of plastic material. Shocks and noises are insulated by the rubber rings and therefore cannot be transmitted from the wheels by way of the guide members to the vehicle superstructure.

Accordingly, it is an object of the present invention to provide an elastic bearing support for a wheel guide structure, especially for the independent suspension of steerable front wheels of motor vehicles which is simple in construction and highly effective to achieve its intended aims and purposes, yet avoids the shortcomings of the prior art constructions in a reliable manner.

Another object of the present invention resides in the provision of elastic bearing supports for guide structures of wheel suspensions which excel above all by an unconstrained absorption of the forces transmitted from the guide structure to the vehicle superstructure including the brake forces.

Still another object of the present invention resides in the provision of an elastic bearing assembly for wheel guide structures of independent wheel suspensions in which all forces and moments are readily transmitted from the guide structure to the vehicle body or frame and which, in particular, is capable of absorbing the brake forces without producing bending stresses.

A still further object of the present invention resides in the provision of an elastic bearing assembly for wheel guide members of steerable front wheels of motor vehicles which allows complete freedom as to the lay-out of the pivot axis of the guide members and obviates the need for small tolerances and accurate fits.

Another object of the present invention resides in the provision of an elastic bearing support for independent wheel suspensions which not only permits a simple construction thereof, especially as regards the shape of the guide structure at the joint connection thereof, but which also minimizes service in addition to assuring good noise and shock insulation.

Figure 2:
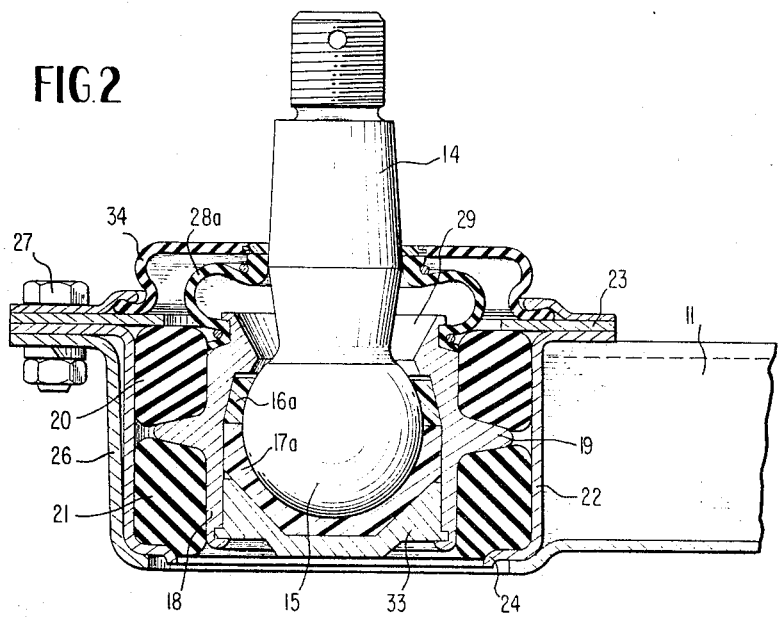
Figure 3:
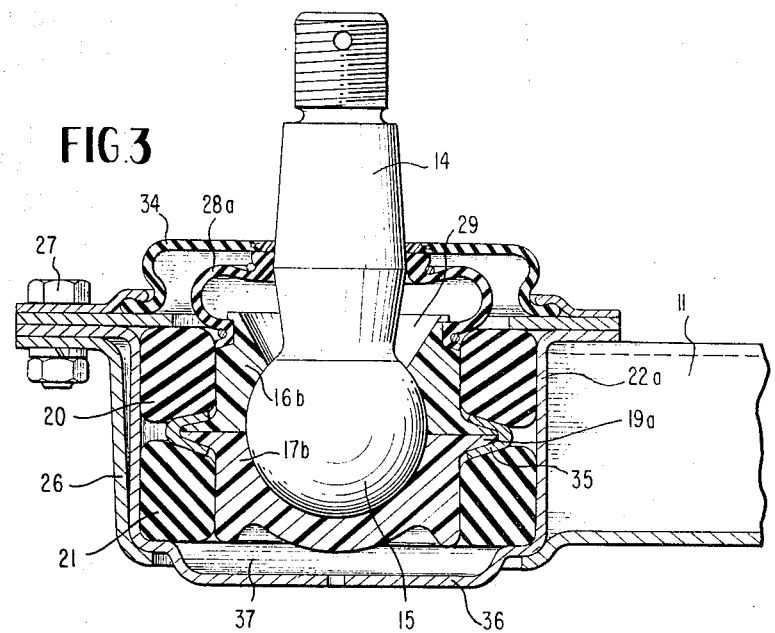

These and further objects, features and advantages of the present invention will become more obvious from the following description when taken with the accompanying drawing, which shows, for purposes of illustration only, three embodiments in accordance with the present invention, and wherein:

FIGURE 1 is a partial cross-sectional elevation view through a joint in accordance with the present invention which connects a wheel guide element with the vehicle superstructure, and FIGURES 2 and 3 are partial cross-sectional elevation views, similar to FIGURE 1, of two further modified embodiments of joint assemblies in accordance with the present invention.

Referring now to the drawing wherein like reference numerals are used throughout the various views to designate like parts, and more particularly to FIGURE 1, reference numeral 10 designates therein a vehicle frame while reference numeral 11 designates therein a conventional guide member of the wheel (not shown). A bearing piece 13 is rigidly secured at the frame 10 by means of screws or bolts 12. The bearing piece 13 serves for the accommodation of the bearing pin 14 provided with the ball head 15. The ball head 15 is inserted into a joint housing 18 under interposition of two bearing sockets 16 and 17 consisting of plastic material. The joint housing 18 is provided with an outwardly directed annular center rib 19 which serves for the axial support of the two rubber rings 20 and 21. The two-partite external sleeve assembly 22, 23 axially secures the rubber rings 20 and 21 on both sides from the outside thereof by means of the collar portions 24 and 25 thereof. The external sleeve 22, 23, in its turn, is inserted into the U-shaped or trough-shaped bearing end 26 of the guide member 11 and is rigidly connected with the guide member 11 by means of screws or bolts 27.

A sealing sleeve 28 seals the interior space 29 of the joint between the joint housing 18 and the bearing piece 13 for the joint bolt 14 in the upward direction whereas the lower seal takes place by a cap 30 which serves simultaneously for the abutment support of a spring coil 31 which, on the one hand, by the interposition of a pressure disk 32, presses from below against the bearing socket 17 and, on the other, presses the joint housing 18 together with the bearing socket 16 from above against the ball head 15.

By reason of the double-yielding support of the guide member 11 by the rubber rings 20 and 21, on the one hand, and by the ball joint 15, 16, 17, on the other, the guide member 11 is relieved of all bending moments which are produced by forces acting on the guide member. The guide member 11 can adjust itself freely relative to the ball pin 15 whereby the rubber rings 20 and 21 take care for the noise- and shock-free transmission of the forces.

The embodiment according to FIGURE 2 differs from that of FIGURE 1 principally in that, in lieu of the spring 31 pressing the bearing sockets 16 and 17 against the ball head 15, a joint cap 33 is provided which is inserted into the joint housing 18 with proper fit and which holds the bearing sockets 16a and 17a made of plastic material in the proper position thereof within the joint housing 18. Simultaneously, the interior space 29 of the joint or the joint itself is sealed against the outside by the cap 33. In addition to the sealing sleeve 28a, a sealing sleeve 34 is provided which seals also the space occupied by the rubber rings 20 and 21 in the upward direction.

The embodiment according to FIGURE 3 differs from the embodiments described above essentially in that a separate joint housing 18 is not provided between the plastic sockets 16b and 17b and the rubber rings 20, 21, but instead the aforementioned plastic bearing sockets 16b and 17b themselves form the joint housing. For purposes of reinforcing the annular ribs 19a formed in two halves at the plastic sockets 16b and 17b, the ribs 19a are reinforced with a roller-in sheet metal ring 35 against which abut with prestress the rubber rings 20 and 21.

The outer sleeve 22a is further completed in the embodiment according to FIGURE 3 into a closed cap 36 which, on the one hand, reinforces the joint and, on the other, axially closes off the space the bearing socket 17b or the lower rubber ring 21 against the outside.

As to the rest, what has been said in connection with FIGURE 1 equally applies to FIGURES 2 and 3.

While we have shown and described three embodiments in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. A bearing support for supporting a wheel guide member of motor vehicles at the vehicle superstructure comprising:
   wheel guide means for guiding the vehicle wheel,
   a relatively fixed vehicle part,
   and means for supporting said wheel guide means at said fixed part including ball joint means having socket means and being secured at said fixed part and two rubber ring means arranged one above the other and operatively interposed between said wheel guide means and said ball joint means, said wheel guide means being provided with outer sleeve means,
   said rubber ring means being inserted into said outer sleeve means and being axially supported thereby, and inner housing means enclosing the socket means of the ball joint means and supporting the rubber ring means in the opposite direction from the outer sleeve means,
   said inner housing means and said outer sleeve means being so dimensioned that the rubber ring means are held under stress.

2. A bearing supporting a wheel guide member of motor vehicles at the vehicle superstructure, comprising:
   wheel guide means for guiding the vehicle wheel,
   a relatively fixed vehicle part,
   and means for supporting said wheel guide means at said fixed part including ball joint means having socket means and secured at said fixed part and two rubber ring means arranged one above the other and operatively interposed between said wheel guide means and said ball joint means,
   the socket means of the ball joint means essentially consisting of plastic material.

3. A bearing support for supporting a wheel guide member of motor vehicles at the vehicle superstructure, comprising:
   wheel guide means for guiding the vehicle wheel,
   a relatively fixed vehicle part,
   and means for supporting said wheel guide means at said fixed part including ball joint means having socket means and secured at said fixed part and two rubber ring means arranged one above the other and operatively interposed between said wheel guide means and said ball joint means,
   the rubber ring means being supported directly on the socket means of the ball joint means.

4. A bearing support for supporting a wheel guide member of motor vehicles at the vehicle superstructure, comprising:
   wheel guide means for guiding the vehicle wheel,
   a relatively fixed vehicle part,
   and means for supporting said wheel guide means at said fixed part including ball joint means having socket means and secured at said fixed part and two rubber ring means arranged one above the other and operatively interposed between said wheel guide means and said ball joint means,
   the rubber ring means being supported directly on the socket means of the ball joint means,
   the socket means essentially consisting of plastic material and being provided with rib means for the axial support of the rubber ring means, and rolled-in sheet metal ring means reinforcing said rib means.

5. A bearing support for supporting a wheel guide member of motor vehicles at the vehicle superstructure, comprising:
   wheel guide means for guiding the vehicle wheel provided with outer sleeve means,
   a relatively fixed vehicle part,
   and means for supporting said wheel guide means at said fixed part including ball joint means having socket means and secured at said fixed part and two rubber ring means arranged one above the other and operatively interposed between said wheel guide means and said ball joint means,
   said rubber ring means being inserted into the outer sleeve means, said wheel guide means being provided with substantially trough-shaped aperture means for receiving therein the outer sleeve means, and means including flange means for securing the outer sleeve means at said wheel guide means.

6. A bearing support for supporting a wheel guide member of motor vehicles at the vehicle superstructure, comprising:
- wheel guide means for guiding the vehicle wheel provided with outer sleeve means,
- a relatively fixed vehicle part,
- and means for supporting said wheel guide means at said fixed part including ball joint means having a joint pin secured at said fixed part and two rubber ring means arranged one above the other and operatively interposed between said wheel guide means and said joint means,
- said rubber ring means being inserted into the outer sleeve means, said wheel guide means being provided with substantially trough-shaped aperture means for receiving therein the outer sleeve means, and means including flange means for securing the outer sleeve means at said wheel guide means,
- said outer sleeve means being constructed simultaneously as a cap closing the joint means on the side opposite the joint pin.

7. A bearing support for supporting a wheel guide member of motor vehicles at the vehicle superstructure, comprising:
- wheel guide means for guiding the vehicle wheel,
- a relatively fixed vehicle part,
- and means for supporting said wheel guide means at said fixed part including ball joint means having socket means and a bearing pin secured at said fixed part and two rubber ring means arranged one above the other and operatively interposed between said wheel guide means and said ball joint means,
- and elastic sealing sleeve means for sealing each of the socket means of said joint means and the interior space of the joint means within the rubber ring means with respect to the bearing pin.

8. A bearing support for supporting a wheel guide member of motor vehicles at the vehicle superstructure, comprising:
- wheel guide means for guiding the vehicle wheel provided with outer sleeve means,
- a relatively fixed vehicle part,
- and means for supporting said wheel guide means at said fixed part including ball joint means secured at said fixed part and two rubber ring means arranged one above the other and operatively interposed between said wheel guide means and said ball joint means,
- said rubber ring means being inserted into the outer sleeve means, said wheel guide means being provided with substantially trough-shaped aperture means for receiving therein the outer sleeve means, and means including flange means for securing the outer sleeve means at said wheel guide means,
- said ball joint means being constituted by a ball head of a bearing pin suspendingly secured at said fixed part,
- and elastic sealing sleeve means for sealing the socket means and the interior space within the rubber ring means of the joint means against the bearing pin means.

9. A bearing support for supporting a wheel guide member of motor vehicles at the vehicle superstructure, comprising:
- wheel guide means for guiding the vehicle wheel provided with outer sleeve means,
- a relatively fixed vehicle part,
- and means for supporting said wheel guide means at said fixed part including ball joint means having a joint pin secured at said fixed part and two rubber ring means arranged one above the other and operatively interposed between said wheel guide means and said ball joint means,
- said rubber ring means being inserted into the outer sleeve means, said wheel guide means being provided with substantially trough-shaped aperture means for receiving therein the outer sleeve means, and means including flange means for securing the outer sleeve means at said wheel guide means,
- said outer sleeve means being constructed simultaneously as a cap closing the joint means on the side opposite the joint pin,
- said ball joint means being constituted by a ball head of a bearing pin suspendingly secured at said fixed part,
- and elastic sealing sleeve means for sealing the socket means and the interior space containing the rubber ring means of the joint means against the bearing pin means.

10. A bearing support for supporting a wheel guide member of motor vehicle superstructure, comprising:
- wheel guide means for guiding the vehicle wheel,
- a relatively fixed vehicle part,
- and means for supporting said wheel guide means at said fixed part including ball joint means having socket means and secured at said fixed part and two rubbering means arranged one above the other and operatively interposed between said wheel guide means and said ball joint means,
- the socket means of the ball joint means essentially consisting of plastic material,
- the rubber ring means being supported directly on the socket means of the ball joint means.

11. A bearing support for supporting a wheel guide member of motor vehicles at the vehicle superstructure, comprising:
- wheel guide means for guiding the vehicle wheel,
- a relatively fixed vehicle part,
- and means for supporting said wheel guide means at said fixed part including ball joint means having socket means and being secured at said fixed part and two rubber ring means arranged one above the other and operatively interposed between said wheel guide means and said ball joint means,
- said wheel quide means being provided with outer sleeve means, said rubber ring means being inserted into said outer sleeve means and being axially supported thereby, and inner housing means enclosing the socket means of the ball joint means and supporting the rubber ring means in the opposite direction from the outer sleeve means,
- said inner housing means and said outer sleeve means being so dimensioned that the rubber ring means are held under stress,
- said socket means being formed by two socket parts surrounding the ball portion of said ball joint means, and means for normally pressing one of said socket parts against said ball portion in one direction and for pressing the other of said socket parts against said ball portion in the oppsite direction including cap means for said ball joint means and spring means between said cap means and one of said two socket parts.

12. A bearing support for supporting a wheel guide member of motor vehicles at the vehicle superstructure, comprising:
- wheel guide means for guiding the vehicle wheel,
- a relatively fixed vehicle part,
- and means for supporting said wheel guide means at said fixed parting including ball joint means having socket means and being secured at said fixed part and two ruber ring means arranged one above the other and operatively interposed between said wheel guide means and sail ball joint means,
- said wheel guide means being provided with outer sleeve means, said rubber ring means being inserted into said outer sleeve means and being axially supported thereby, and inner housing means enclosing the socket means of the ball joint means and supporting the rubber ring means in the opposite direction from the outer sleeve means.

said inner housing means and said outer sleeve means being so dimensioned that the rubber ring means are held under stress, the socket means of the ball joint means essentially consisting of plastic material, said guide means being provided with substantially trough-shaped aperture means for receiving therein the outer sleeve means, and means including flange means for securing the outer sleeve means at said guide means.

13. A bearing support for supporting a wheel guide member of motor vehicles at the vehicle superstructure, comprising:

wheel guide means for guiding the vehicle wheel, a relatively fixed vehicle part, and means for supporting said wheel guide means at said fixed part including ball joint means having socket means and being secured at said fixed part and two rubber ring means arranged one above the other and operatively interposed between said wheel guide means and said ball joint means, said wheel guide means being provided with outer sleeve means, said rubber ring means being inserted into said outer sleeve means and being axially supported thereby, and inner housing means enclosing the socket means of the ball joint means and supporting the rubber ring means in the opposite direction from the outer sleeve means, said inner housing means and said outer sleeve means being so dimensioned that the rubber ring means are held under stress, the socket means of the ball joint means essentially consisting of plastic material, said guide means being provided with substantially trough-shaped aperture means for receiving therein the outer sleeve means, and means including flange means for securing the outer sleeve means at said guide means, said socket means being formed by two socket parts surrounding the ball portion of said ball joint means, and means for normally pressing one of said socket parts against said ball portion in one direction and for pressing the other of said socket parts against said ball portion in the opposite direction including cap means for said ball joint means and spring means between said cap means and one of said two socket parts.

14. A bearing support, especially for the suspension of sterrable front wheels of motor vehicles, comprising:

wheel guide means for guiding the vehicle wheel, a relatively fixed vehicle part, and means for supporting said wheel guide means at said fixed part including ball joint means, having socket means and being secured to said fixed part and two rubber ring means arranged one above the other and operatively interposed between said wheel guide means and said ball joint means, said wheel guide means being provided with outer sleeve means, said rubber ring means being inserted into said outer sleeve means and being axially supported thereby, and inner support means for supporting said rubber ring means in the opposite direction from the outer sleeve means, said inner support means and said outer sleeve means being so dimensioned that said rubber ring means are held under stress.

15. The bearing support according to claim 14 wherein the socket means of said ball joint means essentially consists of plastic material and said guide means are provided with substantially trough-shaped aperture means for receiving therein said outer sleeve means, and means including flange means for securing said outer sleeve means at said wheel guide means.

References Cited by the Examiner

UNITED STATES PATENTS

| 2,855,232 | 10/1958 | Kozak | 287—85 |
| 2,928,687 | 3/1960 | Latzen | 287—90 |
| 3,037,787 | 6/1962 | Gottschald | 280—96.2 |
| 3,052,477 | 9/1962 | Parker | 287—90 X |
| 3,128,110 | 4/1964 | Herbenar | 287—90 |
| 3,144,259 | 8/1964 | De Hann | 280—96.2 |

FOREIGN PATENTS

| 1,102,576 | 3/1961 | Germany. |
| 884,278 | 12/1961 | Great Britain. |
| 1,303,019 | 7/1962 | France. |

KENNETH H. BETTS, *Primary Examiner.*